July 23, 1968 H. SORKIN 3,394,116

TRIFLUOROETHOXYETHYL VINYL ETHER AND POLYMERS THEREOF

Filed March 24, 1965

INVENTOR
HOWARD SORKIN
BY Riggs T. Stewart
ATTORNEY

United States Patent Office 3,394,116
Patented July 23, 1968

3,394,116

TRIFLUOROETHOXYETHYL VINYL ETHER AND POLYMERS THEREOF

Howard Sorkin, Berkeley Heights, N.J., assignor to Air Reduction Company, Incorporated, New York, N.Y., a corporation of New York Filed Mar. 24, 1965, Ser. No. 442,358
2 Claims. (Cl. 260—91.1)

ABSTRACT OF THE DISCLOSURE

Trifluoroethoxy ethyl vinyl ether having the formula $$CF_3CH_2—O—CH_2CH_2—O—CH=CH_2$$

Figure 1:
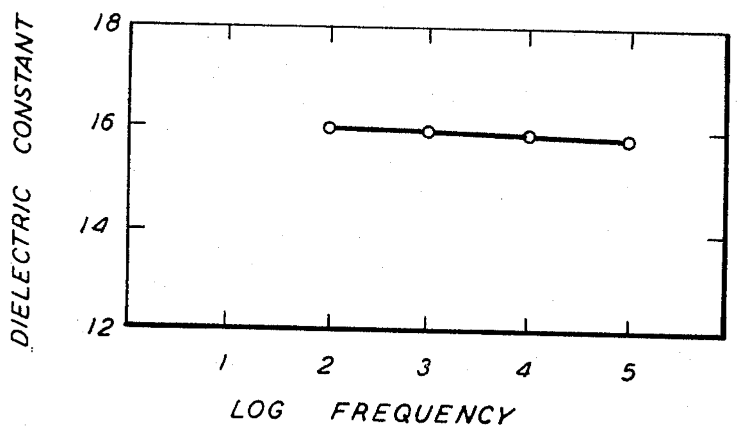

is produced by reacting trifluoroethoxy ethanol with acetylene. This compound can be polymerized to a polymeric composition having in its polymeric structure a moiety of the general formula

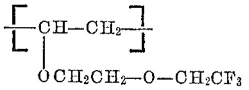

This invention relates to a novel unsaturated compound, to a method for producing the same, and to polymeric compositions prepared therefrom.

For many electrical uses there is a need for polymers having relatively high dielectric constants. The number of known polymers meeting this requirement, however, is relatively small.

It is an object of this invention to provide a polymerizable monomer which can be polymerized to form polymers having desirable dielectric constant values.

It is a further object of the invention to provide polymers having high dielectric constants.

In accordance with this invention there is provided a novel monomer, viz. trifluoroethoxy ethyl vinyl ether. The monomeric compound of this invention can be represented by the formula $$CF_3CH_2—O—CH_2CH_2—O—CH=CH_2$$

This compound is polymerizable and can be used to form polymers characterized by high dielectric constants.

While other vinyl ethers are known, and while they have been polymerized to form polymeric compositions, it has been discovered that trifluoroethoxy ethyl vinyl ether not only is polymerizable to form polymeric compositions which are useful as coatings, impregnants, and for similar purposes, but that these polymers have a relatively high dielectric constant and the unusual property of retaining this high dielectric constant substantially unchanged over a wide frequency range. This makes these polymers particularly useful as impregnants in capacitors. In general, polymers of trifluoroethoxy ethyl vinyl ether have dielectric constants of at least 15.5, and the dielectric constant remains little changed at frequencies ranging from 100 to 100,000 cycles per second, i.e. these polymers exhibit essentially no dispersion in this frequency range. Consequently, they are of particular value for applications in capacitors operating in the audio frequency range.

In general, the trifluoroethoxy ethyl vinyl ether of this invention can be formed by the action of acetylene upon trifluoroethoxy ethanol, i.e. by a so-called "vinylation" reaction. The vinylation of the trifluoroethoxy ethanol is effected in the presence of an appropriate catalyst, such as a solid alkali metal hydroxide, e.g. KOH, or the corresponding alkali metal alcoholate, e.g. potassium trifluoroethoxy ethanolate, the reaction being carried out at an acetylene pressure of 100 to 200 p.s.i. and a temperature of 120 to 170° C. Suitably the acetylene is present with up to an equal amount of nitrogen and the combined pressures of acetylene and nitrogen are 200 to 400 p.s.i. The reaction is continued until no further uptake of acetylene is observed.

The trifluoroethoxy ethyl vinyl ether of this invention has been found to have a boiling point of 129–129.8° C. at 760 mm. Hg.

Trifluoroethoxy ethanol from which the trifluoroethoxy ethyl vinyl ether is prepared is suitably obtained by the action of ethylene oxide upon trifluoroethanol and is described, for example, in J. Am. Chem. Soc. 79, 6533 (1957). The following examples, which are given for illustrative purposes only, serve to show the preparation of the trifluoroethoxy ethyl vinyl ether of this invention, and its polymerization.

Example 1.—Preparation of $CF_3CH_2—O—CH_2CH_2OH$

An autoclave was charged with 200 g. trifluoroethanol and 5 g. KOH. After sealing and purging with nitrogen 110 ml. liquid ethylene oxide was admitted and the mixture heated at 70° C. for 7 hrs. Fractional distillation yielded 145 g. $CF_3CH_2OCH_2CH_2OH$ boiling at 78–79°/54 mm., $n_D^{20}$ 1.3505 (lit. 1.3502). A higher boiling fraction, 91–92°/4.5 mm., $n_D^{20}$ 1.3821, was also obtained (95.6 g). This proved to be the product of the addition of 2 molecules of ethylene oxide to trifluoroethanol $$(CF_3CH_2—O—CH_2CH_2—O—CH_2CH_2OH)$$

Example 2.—Preparation of $$CF_3CH_2—O—CH_2CH_2—O—CH=CH_2$$

An autoclave was charged with 100 g.

$$CH_3CH_2—O—CH_2CH_2OH$$

and 10 g. KOH. The autoclave was pressurized with 100 p.s.i. nitrogen and then acetylene to bring the pressure to 200 p.s.i. After heating at 125° for 2.5 hrs. acetylene was added to increase the pressure to 350 p.s.i. After 17 hrs. at 135° C. the pressure had dropped to 228 p.s.i. and no further uptake was noted. Distillation under reduced pressure gave 43.8 g. product (B.P. 55.5–60°/35–49 mm.) as well as 29.4 g. starting material.

The product was intermittently shaken with sodium for 1 day, filtered through glass wool, and distilled at atmospheric pressure. The material boiled at 129–129.8° C., and weighed 31.4 g. The yield was 38%.

Calcd. for $C_6H_9F_3O_2$: C, 42.10; H, 5.31; F, 33.30. Found: C, 42.15; H, 5.33; F, 32.95.

The polymers of trifluoroethoxy ethyl vinyl ether are characterized by the moiety illustrated below:

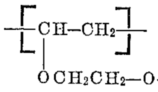

The vinyl groups in the polymer are bonded to other similar or dissimilar moieties, depending on whether the material has been homo- or co-polymerized.

The vinyl radical in these compounds permits the incorporation of the molecule into polymeric materials by either a direct polymerization reaction or by a graft polymerization technique (on an already formed polymer). The polymerization conditions suitably utilized in forming the resinous compounds containing the monomers of this invention are conventional. The polymerization reaction can be effected either in solution, in emulsion using either a bulk or mass polymerization in the absence of a non-reactive solvent, or a dispersing medium. Suitable solvents include benzene, toluene, tetrahydrofuran, and the like. Usually a polymerization initiator is employed and the reaction is heated to accelerate polymerization. The techniques customarily used in polymerizing vinyl monomers are satisfactory for the polymerization of the monomers of this invention. Temperatures of polymerization are those used in vinyl polymer formation, e.g. −80° to 100° C. Polymerization initiators or catalysts include the so-called peroxy catalysts, such as benzoyl peroxide, lauroyl peroxide, tertiary alkyl peroxides, di(tertiary alkyl) peroxides; alkali-metal persulfates such as potassium persulfate; and other polymerization catalysts such as azo-bis-(isobutyronitrile). Particularly suitable for the polymerization of trifluoroethoxy ethyl vinyl ether are molecular sieves. Molecular sieves are well known and typical molecular sieves are described, for example, in the article by R. M. Barrer entitled: "Molecular-sieve Action of Solids" on p. 293 et seq. of Quarterly Review, vol. III, 1949. The amount of catalyst will depend on the polymerization rate desired and on the temperature of polymerization. Generally the amount of catalyst is 0.1 to 5% based on the weight of the monomer.

Example 3.—Polymerization of $$CF_3CH_2—O—CH_2CH_2—O—CH{=}CH_2$$

A mixture of 20 g.

$$CF_3CH_2—O—CH_2CH_2—O—CH{=}CH_2$$

and 1 g. type 5A molecular sieve was stirred at room temperature for 24 hrs. "Molecular Sieve 5A" is a crystalline aluminosilicate salt having channels about 5 angstroms in diameter and in which substantially all of the 12 ions of sodium in the above formula are replaced by calcium, calcium replacing sodium at the rate of one calcium ion for two sodium ions. Molecular sieves of the "A" series consist fundamentally of a three-dimensional tetrahydral structure of silicon and aluminum.

The resulting viscous mixture was poured into dry hexane, to precipitate the polymer and the precipitated product was washed several times with dry hexane, taken up in acetone, filtered, and reprecipitated into dry hexane.

The dielectric constant (E′) and the dissipation factor (tangent $\sigma$) of the polymer produced in Example 3 were determined over the frequency range of 100 to 100,000 cycles per second. The results of these determinations are set forth in the following table:

| | |
|---|---|
| 100 frequency: | |
| E′ | 16.06 |
| Tan $\sigma$ | 0.182 |
| 1000 frequency: | |
| E′ | 15.91 |
| Tan $\sigma$ | 0.018 |
| 10,000 frequency: | |
| E′ | 15.96 |
| Tan $\sigma$ | 0.004 |
| 100,000 frequency: | |
| E′ | 15.86 |
| Tan $\sigma$ | 0.016 |

Figure 2:
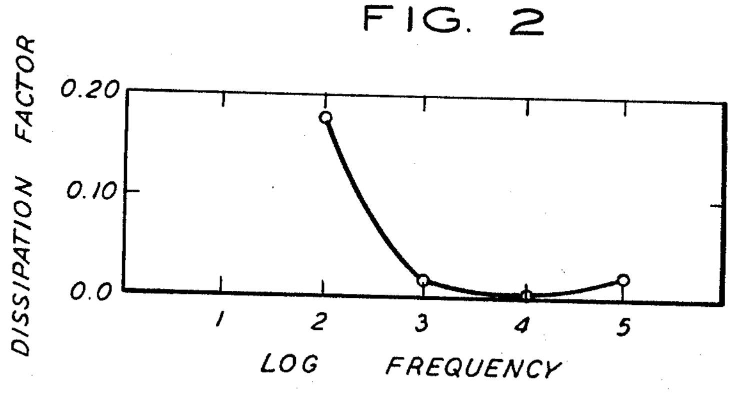

These results are plotted in the accompanying drawing, wherein FIG. 1 is a chart of the dielectric constant plotted against the logarithm of the frequency, and FIG. 2 is a chart of the dissipation factor plotted against the logarithm of the frequency. It will be noted that the dielectric constant remains surprisingly uniform at the desired high level throughout the frequency range at which it was measured, and that the dissipation factor is at a desirable low value throughout the frequency range. Further measurements at 50 cycles showed the polymer to have essentially the same dielectric constant (16.02) at this frequency as it has at 100 cycles.

It will be understood that various changes and modifications may be made in the subject matter described above and illustrated in the drawing without departing from the invention, as defined in the appended claims. For example, the preparation of trifluoroethoxy ethyl vinyl ether is not limited to the process described above, and variations such as are practiced in the art in the vinylation of alcohols may be employed.

It is intended, therefore that all matter contained in the foregoing description and in the drawings shall be interpreted as illustrative only and not as limitative of the invention.

I claim.

1. Trifluoroethoxy ethyl vinyl ether having the formula $$CF_3CH_2—O—CH_2CH_2—O—CH{=}CH_2$$

2. A polymeric composition having in its polymeric structure a moiety of the following general formula

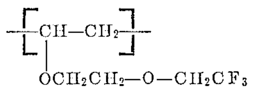

References Cited

UNITED STATES PATENTS 2,157,348 5/1939 Rappe et al. ........ 260—91.1

JOSEPH L. SCHOFER, *Primary Examiner.*

H. WONG, *Assistant Examiner.*